US009369289B1

(12) United States Patent
Harrison et al.

(10) Patent No.: US 9,369,289 B1
(45) Date of Patent: Jun. 14, 2016

(54) METHODS AND SYSTEMS FOR PERFORMING SECURE AUTHENTICATED UPDATES OF AUTHENTICATION CREDENTIALS

(71) Applicant: Google Inc., Mountain View, CA (US)

(72) Inventors: Ryan James Harrison, Mountain View, CA (US); Christopher Wolfe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 62 days.

(21) Appl. No.: 13/944,222

(22) Filed: Jul. 17, 2013

(51) Int. Cl.
*H04L 29/06* (2006.01)
*H04L 9/32* (2006.01)

(52) U.S. Cl.
CPC .................. *H04L 9/3268* (2013.01)

(58) Field of Classification Search
CPC ..... H04L 9/32; H04L 63/0407; H04L 9/0891; H04L 9/3268
USPC ................ 726/1; 380/286; 713/158
See application file for complete search history.

(56) References Cited

U.S. PATENT DOCUMENTS

| 6,052,468 A | 4/2000 | Hillhouse |
| 6,085,320 A * | 7/2000 | Kaliski, Jr. ............ 713/168 |
| 8,290,165 B2 | 10/2012 | Allen et al. |
| 2006/0242415 A1 * | 10/2006 | Gaylor .................... 713/176 |
| 2007/0174906 A1 * | 7/2007 | Burchett et al. .......... 726/8 |
| 2008/0046982 A1 * | 2/2008 | Parkinson ............... 726/5 |
| 2009/0154703 A1 * | 6/2009 | Price et al. .............. 380/277 |
| 2011/0055299 A1 * | 3/2011 | Phillips ................ 707/827 |
| 2013/0046993 A1 | 2/2013 | Jueneman et al. |
| 2013/0061049 A1 | 3/2013 | Irvine |

OTHER PUBLICATIONS

Hoeper, K., "Authentication and Key Exchange in Mobile Ad Hoc Networks", A Thesis presented to the University of Waterloo, Waterloo, Ontario, Canada, 2007.

* cited by examiner

*Primary Examiner* — Hadi Armouche
*Assistant Examiner* — Angela Holmes
(74) *Attorney, Agent, or Firm* — Fox Rothschild LLP

(57) ABSTRACT

A method of updating an authentication credential may include, by a client device, receiving an authentication credential from a user, generating an access key using the authentication credential, determining whether the access key decrypts a storage key that encrypts at least a portion of a computer-readable storage medium of the client device, and in response to determining that access key does not decrypt the storage key, sending a request to an authentication server. The request may include the authentication credential. The method may include receiving, from the authentication server, a recovery key, and generating an updated storage key using the decryption key.

13 Claims, 4 Drawing Sheets

METHODS AND SYSTEMS FOR PERFORMING SECURE AUTHENTICATED UPDATES OF AUTHENTICATION CREDENTIALS

BACKGROUND

File systems and hard drives of portable computing devices are typically capable of being encrypted. When encrypted, a user usually must enter a password before gaining access to the device. On the first boot after a user updates his or her password with an authentication server, a decrypted password may reflect the old password for the device until the user takes an action to update the password on the device.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of updating an authentication credential may include, by a client device, receiving an authentication credential from a user, generating an access key using the authentication credential, determining whether the access key decrypts a storage key that encrypts at least a portion of a computer-readable storage medium of the client device, and in response to determining that access key does not decrypt the storage key, sending a request to an authentication server. The request may include the authentication credential. The method may include receiving, from the authentication server, a recovery key, and generating an updated storage key using the decryption key.

In an embodiment, a method of updating an authentication credential may include, by an authentication server, receiving, from a client device during a first stage of a boot process, a request to verify an authentication credential of a user. The request may include the authentication credential, a unique client device identifier associated with the client device, and a unique user identifier associated with the user. The method may include determining whether the authentication credential corresponds to the unique client device identifier and the unique user identifier, and in response to determining that the authentication credential corresponds to the unique client device identifier and the unique user identifier, sending a key to the client device.

In an embodiment, a method of updating an authentication credential may include, by an authentication server, determining that an authentication credential associated with a user and a client device has been updated, determining that the client device is in an inactive mode, and waking the client device by sending the client device an indication to revoke one or more current access keys associated with the client device, and one or more of the following: one or more new access keys corresponding to the updated authentication credential, and a recovery key or portion thereof.

In an embodiment, a system of updating an authentication credential may include a computing device and a computer-readable storage medium in communication with the computing device. The computer-readable storage medium may include one or more instructions that, when executed, cause the computing device to receive an authentication credential from a user, generate an access key using the authentication credential, determine whether the access key decrypts a storage key that encrypts at least a portion of the computer-readable storage medium, and in response to determining that access key does not decrypt the storage key, send a request to an authentication server. The request may include the authentication credential. The computer-readable storage medium may include one or more instructions that, when executed, cause the computing device to receive, from the authentication server, a recovery key, and generate an updated storage key using the decryption key.

DETAILED DESCRIPTION

The following terms shall have, for purposes of this application, the respective meanings set forth below:

An "access key" refers to a key that is used to encrypt and/or decrypt a storage key. An access key may symmetric or asymmetric, and may be derived from one or more authentication credentials. In an embodiment, an access key may be stored in a protected location.

An "authentication credential" refers to an electronic token or other object unique to a user that the user can present to gain access to a computing system. Example authentication credentials may include, without limitation, a username, a password, a biometric, an answer to a security question, a combination of any of the foregoing and/or the like.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "recovery key" refers to an asymmetric access key that is stored or generated by an authentication computing device. A user computing device may only have access to the encryption portion of a recovery key so that it can maintain copies of one or more storage keys encrypted with the recovery key. In an embodiment, an authentication computing device may provide the decryption portion of a recovery key to a user computing device so that the user computing device can recover one or more of its storage keys.

A "storage key" refers to a key that is used to encrypt and/or decrypt portions of a user computing device's storage. A storage key may be a symmetric key. In an embodiment, one or more copies of each storage key may be stored on a user computing device in an encrypted form and may be protected by one or more access keys. Multiple storage keys may be used to separate storage for different users or for multiple levels of security.

Figure 1:
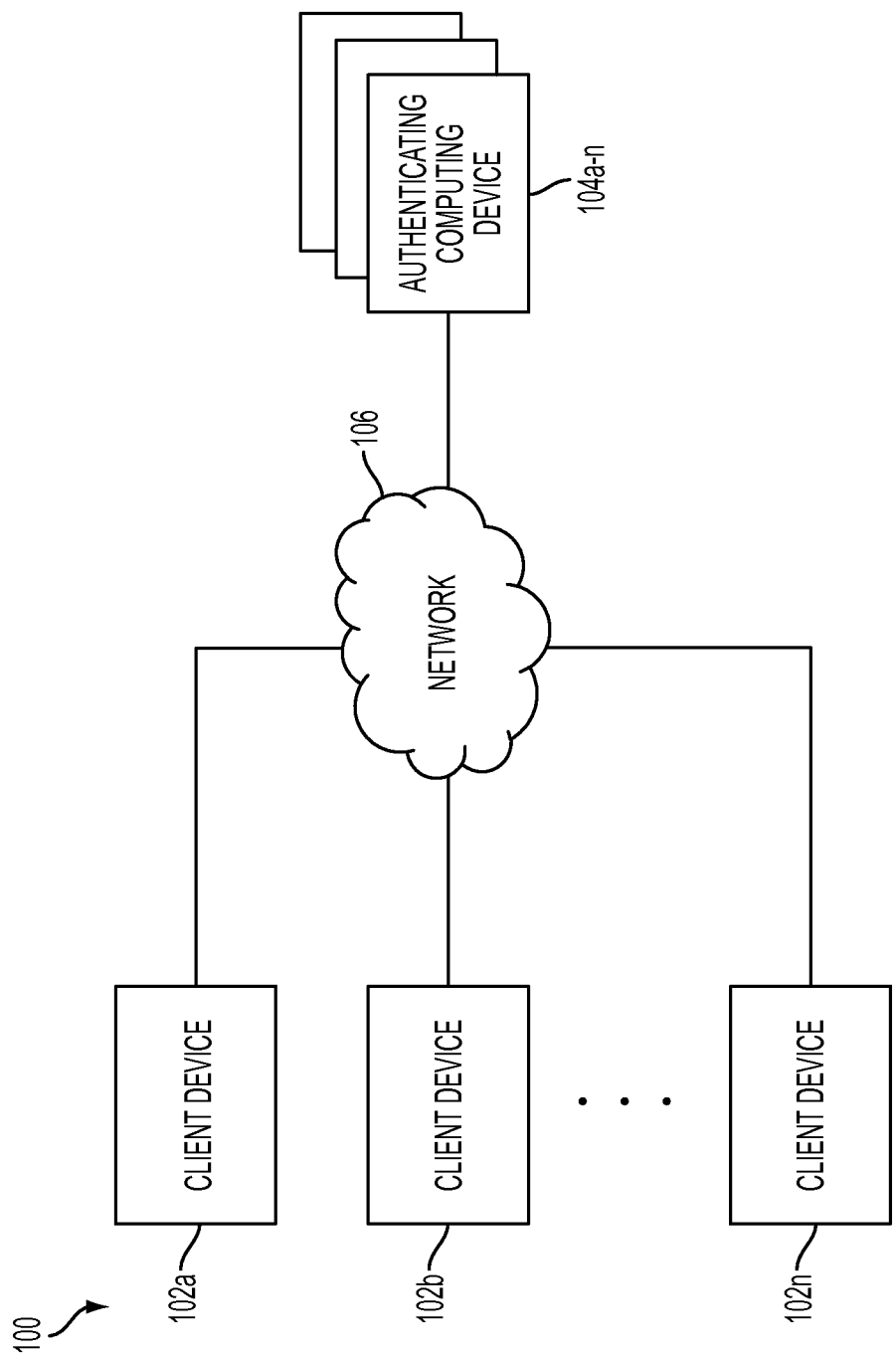
FIG. 1 illustrates an example system for updating and/or maintaining authentication credentials according to an embodiment.

FIG. 1 illustrates an example system for updating and/or maintaining authentication credentials according to an embodiment. As shown in FIG. 1, a system 100 may include one or more client devices 102a-N in communication with one or more authentication computing devices 104a-N over one or more communication networks 106.

In an embodiment, a client device 102a-N may be a computing device that belongs to and/or is used by a system user. Example client devices 102a-N may include, without limitation, laptop computers, desktop computers, portable computing devices, smartphones, tablet computers and/or the like.

In an embodiment, an authentication computing device 104a-N may be a computing device configured to verify or authenticate one or more of a user's authentication credentials. Example authentication computing devices 104a-N may include, without limitation, servers, mainframes and/or the like.

In an embodiment, a communication network 106 may be a local area network (LAN), a wide area network (WAN), a mobile or cellular communication network, an extranet, an intranet, the Internet and/or the like. In an embodiment, the communication network 106 may provide communication capability between one or more client devices 102a-N and one or more authentication computing devices 104a-N.

In an embodiment, the file systems and/or hard drive of a client device may be encrypted. As such, a user may be required to provide one or more authentication credentials before gaining access to the client device. One or more of the provided authentication credentials may be used to generate one or more access keys, which in turn may be used to decrypt one or more storage keys. If the decryption succeeds, a user may be granted access to the client device's file systems and/or hard drive. In an embodiment, a client device may perform a two-stage boot process. The first stage may stage may be implemented via a boot loader or firmware. The second stage may involve the full operating system.

Figure 2:
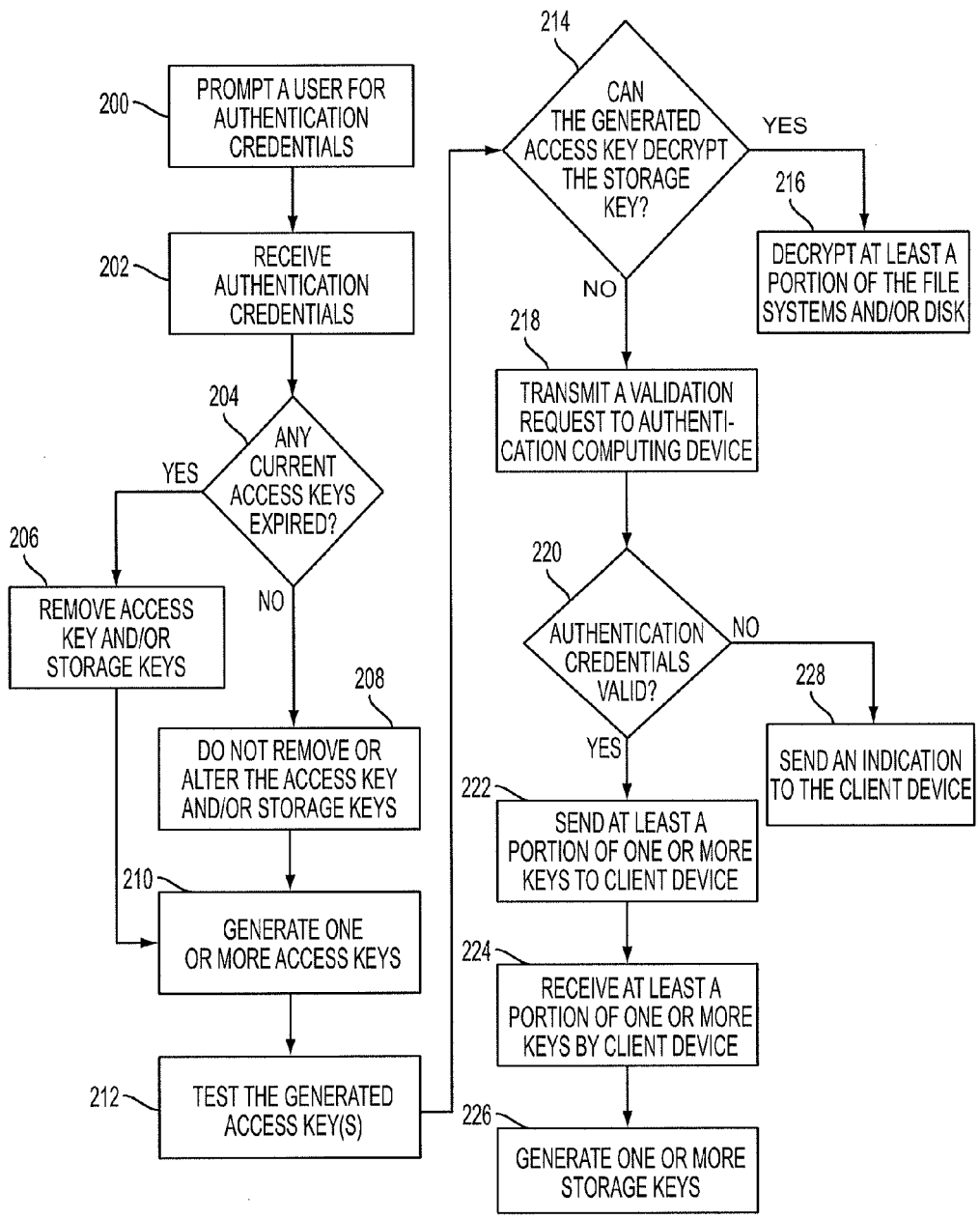
FIGS. 2 and 3 illustrate example methods of updating and/or verifying an authentication credential according to various embodiments.

FIG. 2 illustrates an example method of updating and/or verifying an authentication credential according to an embodiment. In an embodiment, updating and/or verifying an authentication credential may be performed automatically during a first stage of a boot process of a client device. In another embodiment, a client device may initiate an update or verification process in response to receiving an indication from a user that an authentication credential for the user has been changed. For example, a user may select a "synch" or other option which may instruct the client device to begin updating and/or verifying an authentication credential.

As illustrated by FIG. 2, a client device may prompt 200 a user for one or more authentication credentials. For example, a client device may prompt a user to provide a username and password. In an embodiment, the client device may receive 202 one or more authentication credentials from a user.

The client device may determine 204 whether any current access keys of the client device have expired. In an embodiment, an access key may have an expiration date associated with it. An expiration date may refer to a date and/or a time after which the access key can no longer be used. In an embodiment, a client device may determine 204 whether an access key has expired by comparing the date and/or time of the access key's expiration date to a current date and/or time. If the current date and/or time is later than the expiration date and/or time, the access key may be determined 204 to be expired.

If the client device determines 204 that an access key has expired, the client device may remove 206 the access key and/or any storage keys protected by the removed access key. If the client device determines 204 that an access key has not expired, the client device may not remove 208 or otherwise alter the access key and/or any storage keys protected by the access key.

In an embodiment, the client device may generate 210 one or more access keys. The client device may generate 210 one or more access keys based on, at least in part, the received authentication credentials. The client device may test 212 the generated access key(s) against one or more storage keys. In an embodiment, the client device may test 212 a generated access key against a storage key by determining 214 whether the generated access key is able to successfully decrypt the storage key. If the client device determines 214 that the generated access key is able to successfully decrypt the storage key, then the decrypted storage key may be used to decrypt 216 at least a portion of the file systems and/or disk of the user computing device, and the second stage of the boot process may proceed.

In an embodiment, if the client device determines 214 that the generated access key is unable to successfully decrypt the storage key, the client device may determine whether one or more other failed attempts to access the client device have occurred. In an embodiment, the client device may determine whether one or more other failed attempts to access the client device have occurred within a certain time period. If the client device determines that another failed attempt has occurred, the client device may remove one or more current access keys of the client device and/or one or more storage keys protected by the one or more current access keys.

In an embodiment, if the client device determines 214 that the generated access key is unable to successfully decrypt the storage key, the client device may transmit 218 a validation request to one or more authentication computing devices. The validation request may include at least a portion of the received authentication credentials, a unique client device identifier associated with the client device, a unique user identification associated with the user and/or the like.

In an embodiment, the authentication computing device may determine 220 whether the received authentication credentials are valid. The authentication computing device may compare at least a portion of the received authentication credentials, the unique client device identifier and/or the unique user identification to information stored by the authentication computing device to determine 220 whether the received authentication credentials are valid. For example, an authentication computing device may determine 220 whether the received authentication credentials are valid by determining whether the received authentication credentials correspond to the unique client device identifier and the unique user identifier.

In an embodiment, if the authentication computing device determines 220 that the authentication credentials are valid, the authentication computing device may send 222 at least a portion of one or more keys to the client device. For example, the authentication computing device may send 222 one or more access keys to the client device. As another example, the authentication computing device may send 222 a decryption portion of one or more recovery keys to a client device. In an embodiment, a security policy associated with an authentication computing device may specify what type of key the authentication computing device should send to the client device.

In an embodiment, the client device may receive 224 at least a portion of one or more keys from an authentication computing device. The client device may use the received keys to generate 224 one or more storage keys. For example, if the client device receives 224 one or more access keys from an authentication computing device, the client device may use the received access keys to generate 226 one or more storage keys. Similarly, if the client device receives 224 a decryption portion of a recovery key from an authentication computing device, the client device may use the decryption portion to generate at least a portion of one or more new storage keys.

In an embodiment, if the authentication computing device determines that the authentication credentials are invalid, the authentication computing device may send 228 an indication to the client device. In an embodiment, the indication may include one or more instructions that instruct the client device to remove one or more of the access keys and/or storage keys protected by the removed access keys. In an embodiment, the indication may not include instructions, but the client device may, in response to receiving the indication, may remove one or more access keys and/or storage keys protected by the removed access keys.

Figure 3:
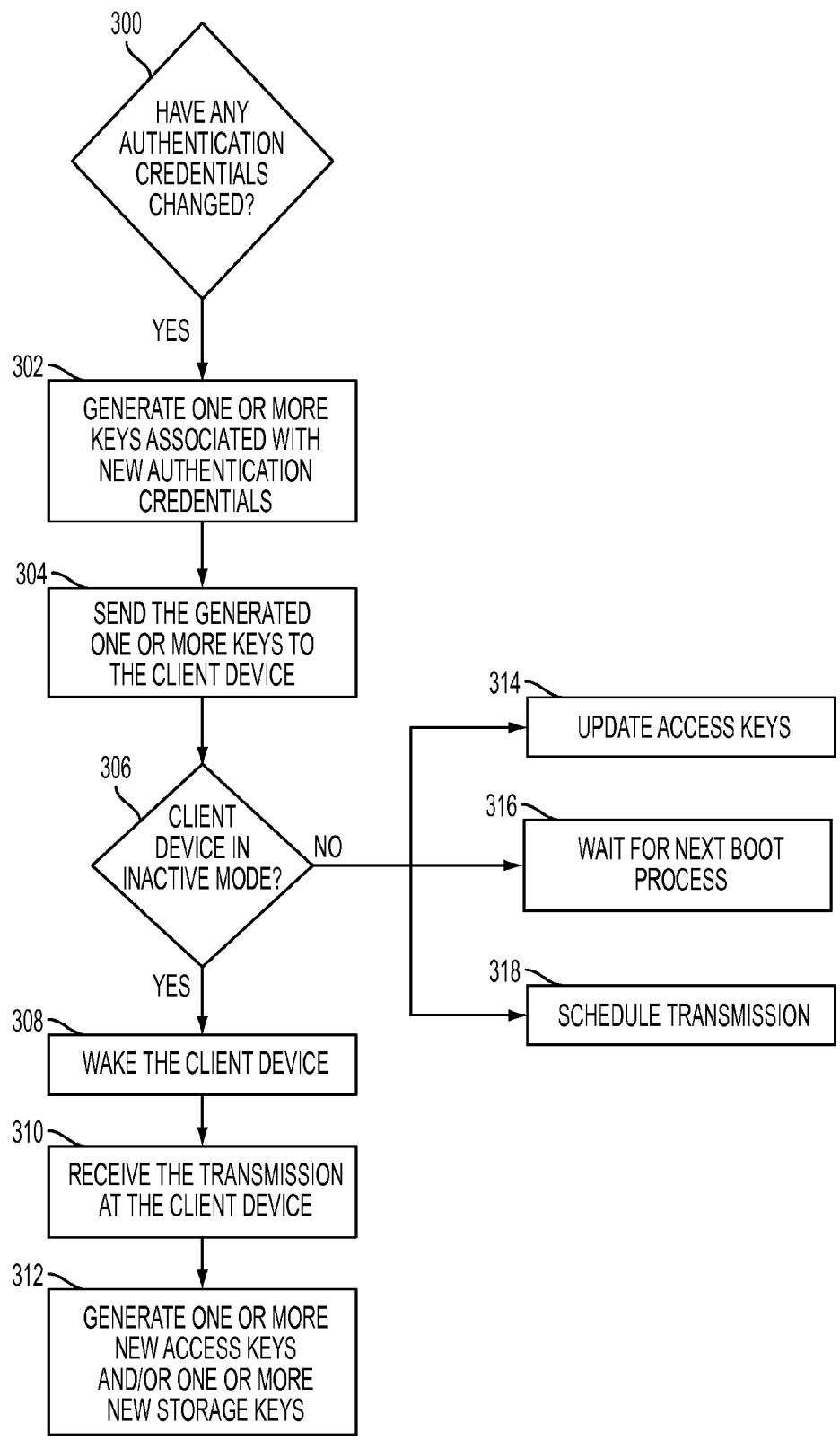

In an embodiment, an authentication computing device may update one or more access keys on a client device. FIG. 3 illustrates an example method of updating and/or verifying an authentication credential according to an embodiment. As illustrated by FIG. 3, an authentication computing device may determine 300 that one or more authentication credentials for a user have changed. An authentication credential may change in response to a user updating the authentication credential, removal of a user's access to a client device, disabling of a lost client device and/or the like. In an embodiment, an authentication computing device may send an indication that an authentication credential has changed to a client device. For example, an authentication computing device may send an indication that an authentication credential has been revoked to a client device.

In an embodiment, an authentication credential may change in response to being revoked. The authentication computing device may generate 302 one or more keys associated with the new authentication credentials. For example, the authentication computing device may generate 302 one or more access keys associated with the new authentication credentials. In an embodiment, the authentication computing device may generate 302 at least a portion of a recovery key associated with the new authentication credentials.

In an embodiment, the authentication computing device may send 304 the generated keys to a client device. The authentication computing device may determine 306 whether the client device is in an inactive mode. An inactive mode may refer to a low power mode for a client device such as, for example, sleep mode or hibernation mode.

If the authentication device determines 306 that the client device is in an inactive mode, the authentication computing device may wake 308 the client device. In an embodiment, the authentication computing device may wake 308 the client device by sending the client device a transmission that includes certain information. The information may include, without limitation, an indication that one or more current access keys have been revoked, an indication to remove one or more current access keys associated with the client device, one or more new access keys corresponding to the updated authentication credential, and/or a recovery key or portion thereof. In an embodiment, the client device may receive 310 the transmission, and may use the information in the transmission to generate 312 one or more new access keys and/or one or more storage keys.

In an embodiment, if the authentication device determines 306 that the client device is not in an inactive mode, the authentication computing device may update 314 one or more access keys for the client device in the background while the client device is active. For example, the authentication device may send the client device a transmission that includes certain information. The information may include, without limitation, an indication that one or more current access keys have been revoked, an indication to remove one or more current access keys associated with the client device, one or more new access keys corresponding to the updated authentication credential, and/or a recovery key or portion thereof.

In an embodiment, if the authentication device determines 306 that the client device is not in an inactive mode, the authentication computing device may wait 316 for the client device to initiate a next boot process to perform a key update.

In an embodiment, if the authentication device determines 306 that the client device is not in an inactive mode, the authentication computing device may schedule 318 a transmission to the client device for when the client device becomes inactive. For example, an authentication computing device may prepare a transmission that includes certain information. The information may include, without limitation, an indication that one or more current access keys have been revoked, an indication to remove one or more current access keys associated with the client device, one or more new access keys corresponding to the updated authentication credential, and/or a recovery key or portion thereof. The authentication computing device may schedule 318 the transmission to be sent when the client device is in an inactive mode. For example, the authentication computing device may periodically check to see if the client device is inactive. In response to determining that the client device is inactive, the authentication computing device may send the transmission.

Figure 4:
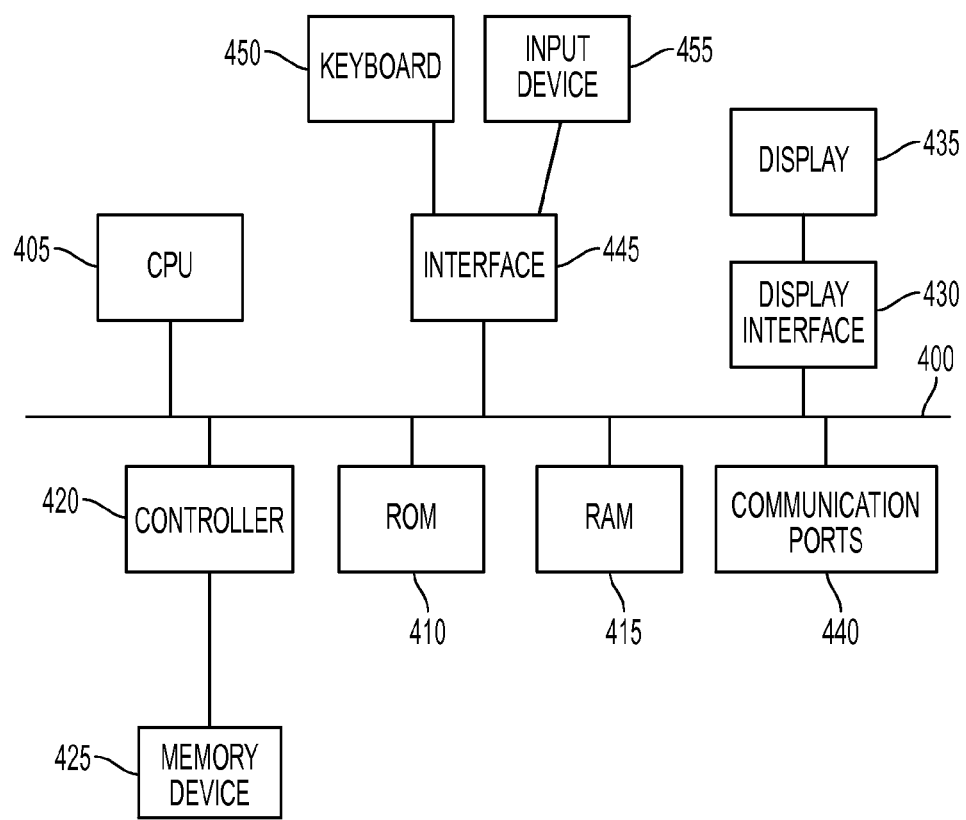
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of updating an authentication credential, the method comprising:
by one or more client devices, each associated with a user:
receiving an authentication credential from the user;
generating an access key that is derived from the authentication credential;
determining whether the access key decrypts a storage key that encrypts at least a portion of a computer-readable storage medium of the client device by determining whether the access key decrypts a storage key that encrypts at least a portion of a computer-readable storage medium of the client device during a first stage of a boot process of the client device, wherein the first stage of the boot process is implemented via a boot loader and occurs prior to a boot of an operating system of the client device;
in response to determining that the access key decrypts the storage key:
decrypting the storage key with the access key to create a decrypted storage key, and
decrypting the at least a portion of the computer-readable storage medium of the client device with the decrypted storage key; and
in response to determining that the access key does not decrypt the storage key:
sending a request to an authentication server, wherein the request comprises the authentication credential,
receiving, from the authentication server, a decryption half of a recovery key,
generating an updated storage key using the decryption half of the recovery key; and
in response to generating an updated storage key using the decryption half of the recovery key, providing the user with access to the client device.

2. The method of claim 1, wherein receiving an authentication credential from a user comprises receiving the authentication credential from a user in response to prompting the user to provide the authentication credential.

3. The method of claim 1, wherein receiving an authentication credential from a user comprises receiving the authentication credential from a user in response to receiving an indication that the authentication credential should be updated.

4. The method of claim 1, further comprising:
determining, by the client device, whether a current access key has expired; and
in response to determining that the current access key has expired, removing the current access key and all storage keys protected by the current access key from the client device.

5. The method of claim 1, further comprising:
receiving, from the authentication server, an indication that a current access key has been revoked; and
removing all storage keys protected by the current access key from the client device.

6. The method of claim 1, further comprising:
in response to determining that access key does not decrypt the storage key, determining whether another failed attempt to decrypt the storage key has occurred; and
in response to determining that another failed attempt to decrypt the storage key has occurred, revoking one or more current access keys.

7. The method of claim 6, wherein revoking one or more current access keys comprises revoking one or more current access keys according to a security policy associated with the authentication server.

8. A system of updating an authentication credential, the system comprising:
a computing device; and
a computer-readable storage medium in communication with the computing device, wherein the computer-readable storage medium comprises one or more instructions that, when executed, cause the computing device to:
receive an authentication credential from a user,
generate an access key that is derived from the authentication credential,
determine whether the access key decrypts a storage key that encrypts at least a portion of the computer-readable storage medium by determining whether the access key decrypts a storage key that encrypts at least a portion of a computer-readable storage medium of the client device during a first stage of a boot process of the client device, wherein the first stage of the boot process is implemented via a boot loader and occurs prior to a boot of an operating system of the client device,
in response to determining that the access key decrypts the storage key:
decrypt the storage key using the access key to create a decrypted storage key, and
use the decrypted storage key to decrypt the at least a portion of the computer-readable storage medium of the client device; and
in response to determining that access key does not decrypt the storage key:
send a request to an authentication server, wherein the request comprises the authentication credential,
receive, from the authentication server, a decryption half of a recovery key,
generate an updated storage key using the decryption half of the recovery key, and
in response to generating an updated storage key using the decryption half of the recovery key, provide the user with access to the client device.

9. The system of claim 8, wherein the one or more instructions that, when executed, cause the computing device to receive an authentication credential from a user comprise one or more instructions that, when executed, cause the computing device to receive the authentication credential from a user in response to prompting the user to provide the authentication credential.

10. The system of claim 8, wherein the one or more instructions that, when executed, cause the computing device to receive an authentication credential from a user comprise one or more instructions that, when executed, cause the computing device to receive the authentication credential from a user in response to receiving an indication that the authentication credential should be updated.

11. The system of claim 8, wherein the computer-readable storage medium further comprises one or more programming instructions that, when executed, cause the computing device to:
- determine whether a current access key has expired; and
- in response to determining that the current access key has expired, remove the current access key and all storage keys protected by the current access key from the client device.

12. The system of claim 8, wherein the computer-readable storage medium further comprises one or more programming instructions that, when executed, cause the computing device to:
- receive, from the authentication server, an indication that a current access key has been revoked; and
- remove all storage keys protected by the current access key from the client device.

13. The system of claim 8, wherein the computer-readable storage medium further comprises one or more programming instructions that, when executed, cause the computing device to:
- in response to determining that access key does not decrypt the storage key, determine whether another failed attempt to decrypt the storage key has occurred; and
- in response to determining that another failed attempt to decrypt the storage key has occurred, revoke one or more current access keys.

\* \* \* \* \*